United States Patent
Yuan-Huffman et al.

(10) Patent No.: US 10,017,683 B2
(45) Date of Patent: Jul. 10, 2018

(54) INTERNAL POLYMERIC BREAKER FOR VISCOELASTIC SURFACTANT-BASED FLUIDS

(71) Applicant: Akzo Nobel Chemicals International B.V., Arnhem (NL)

(72) Inventors: Qingwen Wendy Yuan-Huffman, Belle Mead, NJ (US); Kai Kang, Shanghai (CN); Bo Wu, Shanghai (CN)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/528,845

(22) PCT Filed: Nov. 23, 2015

(86) PCT No.: PCT/EP2015/077386
§ 371 (c)(1),
(2) Date: May 23, 2017

(87) PCT Pub. No.: WO2016/083318
PCT Pub. Date: Jun. 2, 2016

(65) Prior Publication Data
US 2017/0313929 A1    Nov. 2, 2017

Related U.S. Application Data

(60) Provisional application No. 62/083,611, filed on Nov. 24, 2014.

(30) Foreign Application Priority Data

Feb. 2, 2015  (EP) ..................... 15153401

(51) Int. Cl.
| | | |
|---|---|---|
| E21B 43/16 | (2006.01) | |
| C09K 8/68 | (2006.01) | |
| C09K 8/60 | (2006.01) | |
| C09K 8/575 | (2006.01) | |
| E21B 41/02 | (2006.01) | |
| E21B 37/06 | (2006.01) | |
| E21B 43/267 | (2006.01) | |
| E21B 43/25 | (2006.01) | |
| E21B 43/04 | (2006.01) | |

(52) U.S. Cl.
CPC ............ *C09K 8/602* (2013.01); *C09K 8/5753* (2013.01); *C09K 8/68* (2013.01); *E21B 37/06* (2013.01); *E21B 41/02* (2013.01); *E21B 43/16* (2013.01); *C09K 2208/26* (2013.01); *C09K 2208/30* (2013.01); *E21B 43/04* (2013.01); *E21B 43/25* (2013.01); *E21B 43/267* (2013.01)

(58) Field of Classification Search
CPC .......... C09K 8/68; C09K 8/588; C09K 8/685; C09K 8/74; C09K 2208/00; E21B 43/26; E21B 43/16
See application file for complete search history.

(56) References Cited

U.S. PATENT DOCUMENTS

| | | |
|---|---|---|
| 4,384,096 A | 5/1983 | Sonnabend |
| 4,421,902 A | 12/1983 | Chang et al. |
| 4,514,552 A | 4/1985 | Shay et al. |
| 4,600,761 A | 7/1986 | Ruffner et al. |
| 4,616,074 A | 10/1986 | Ruffner |
| 5,292,843 A | 3/1994 | Jenkins et al. |
| 5,294,692 A | 3/1994 | Barron et al. |
| 5,412,142 A | 5/1995 | Wilkerson, III et al. |
| 5,639,841 A | 6/1997 | Jenkins |
| 5,770,760 A | 6/1998 | Robinson |
| 6,881,709 B2 | 4/2005 | Nelson et al. |
| 7,084,095 B2 | 8/2006 | Lee et al. |
| 7,635,028 B2 | 12/2009 | Li et al. |
| 7,655,603 B2 | 2/2010 | Crews |
| 7,879,770 B2 | 2/2011 | Lin et al. |
| 8,813,874 B2 | 8/2014 | James et al. |
| 2005/0107503 A1 | 5/2005 | Couillet et al. |
| 2008/0190615 A1 | 8/2008 | Drochon |
| 2009/0111716 A1 | 4/2009 | Hough et al. |
| 2009/0192053 A1 | 7/2009 | Crews et al. |
| 2011/0198089 A1 | 8/2011 | Panga et al. |

(Continued)

FOREIGN PATENT DOCUMENTS

| | | |
|---|---|---|
| WO | 01/77487 A2 | 10/2001 |
| WO | 2004057155 A1 | 7/2004 |
| WO | 2006130675 A2 | 12/2006 |
| WO | 2007141731 A1 | 12/2007 |
| WO | 2009032524 A1 | 3/2009 |
| WO | 2011023966 A1 | 3/2011 |
| WO | 2011100665 A2 | 8/2011 |
| WO | 2012080382 A1 | 6/2012 |

OTHER PUBLICATIONS

International Search Report and Written Opinion for PCT/EP2015/077386 dated Jan. 28, 2016.
European Search Report filed in 15153401.3-1354 dated Jul. 17, 2015.
International Preliminary Report on Patentability for PCT/EP2015/077386 dated Nov. 4, 2016.

*Primary Examiner* — Zakiya W Bates
(74) *Attorney, Agent, or Firm* — Matthew J. DeRuyter

(57) ABSTRACT

Compositions and methods are provided for delayed breaking of viscoelastic surfactant gels inside subterranean formations. Breaking is accomplished without mechanical intervention or use of a second fluid. The delayed breaking agent is a hydrophobically modified alkali swellable emulsion polymer, which can be a copolymer comprising acidic monomers, nonionic monomers, and associative monomers. The viscoelastic surfactant can be a zwitterionic surfactant, and can be selected from the group consisting of sultaines, betaines, and amidoamine oxides.

14 Claims, 9 Drawing Sheets

(56) References Cited

U.S. PATENT DOCUMENTS

| | | |
|---|---|---|
| 2011/0256085 A1* | 10/2011 | Talingting Pabalan ............................ A61K 8/042 424/70.13 |
| 2012/0024529 A1 | 2/2012 | Van Zenten et al. |
| 2014/0178324 A1* | 6/2014 | Martinez-Castro .... C09K 8/882 424/70.16 |
| 2014/0251610 A1 | 9/2014 | Brannon et al. |
| 2014/0262293 A1 | 9/2014 | Song et al. |

* cited by examiner

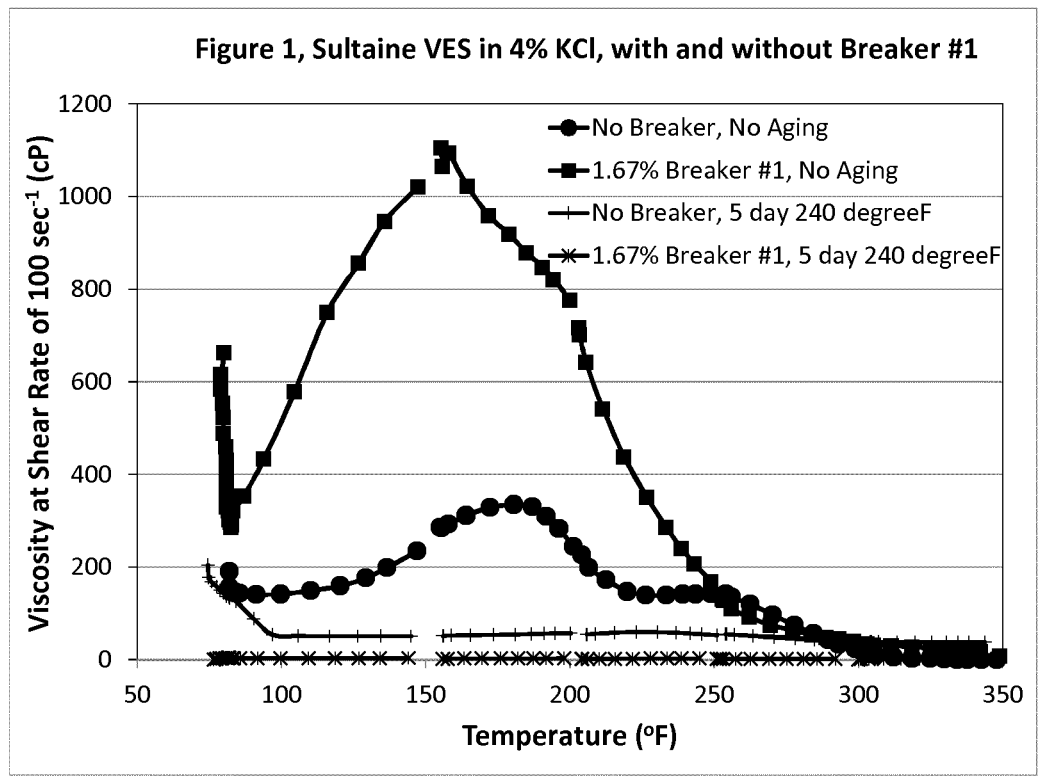

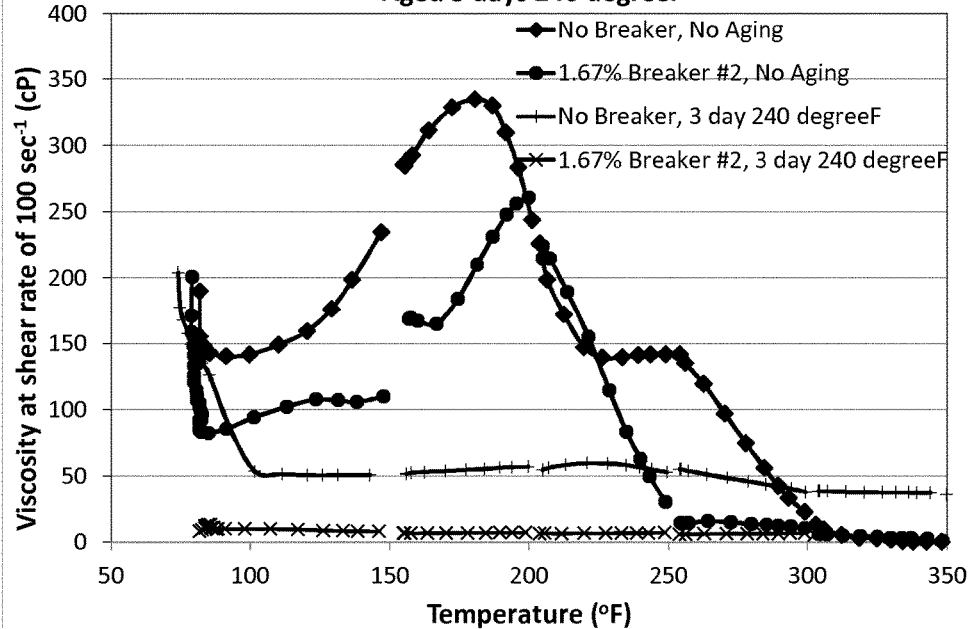
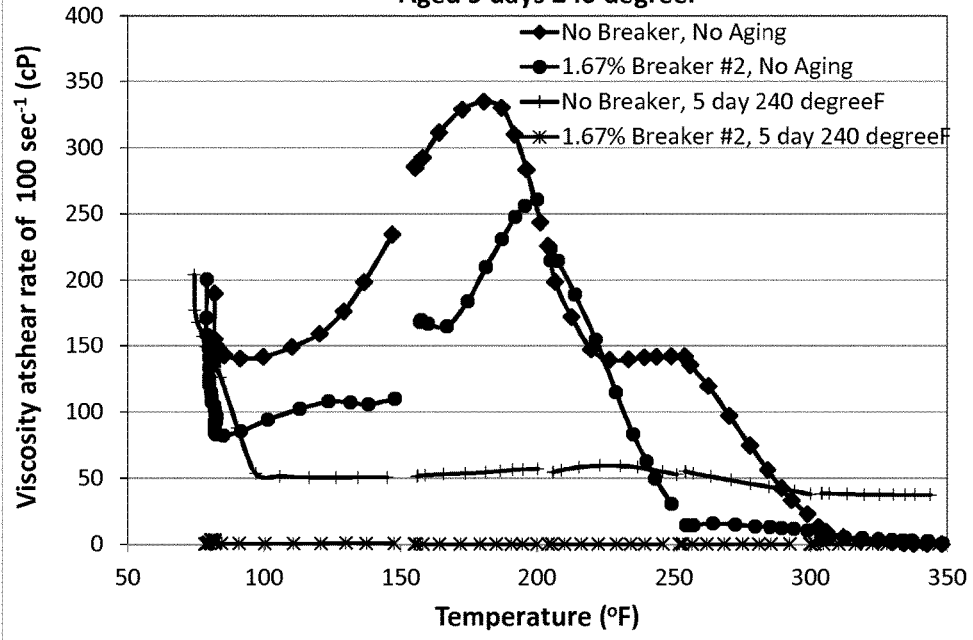

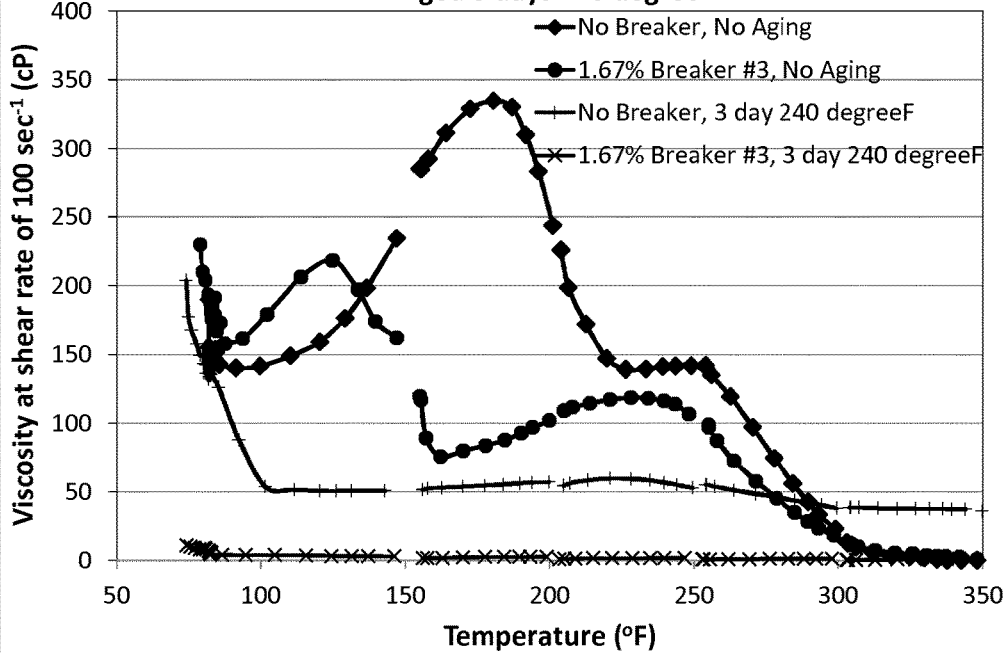
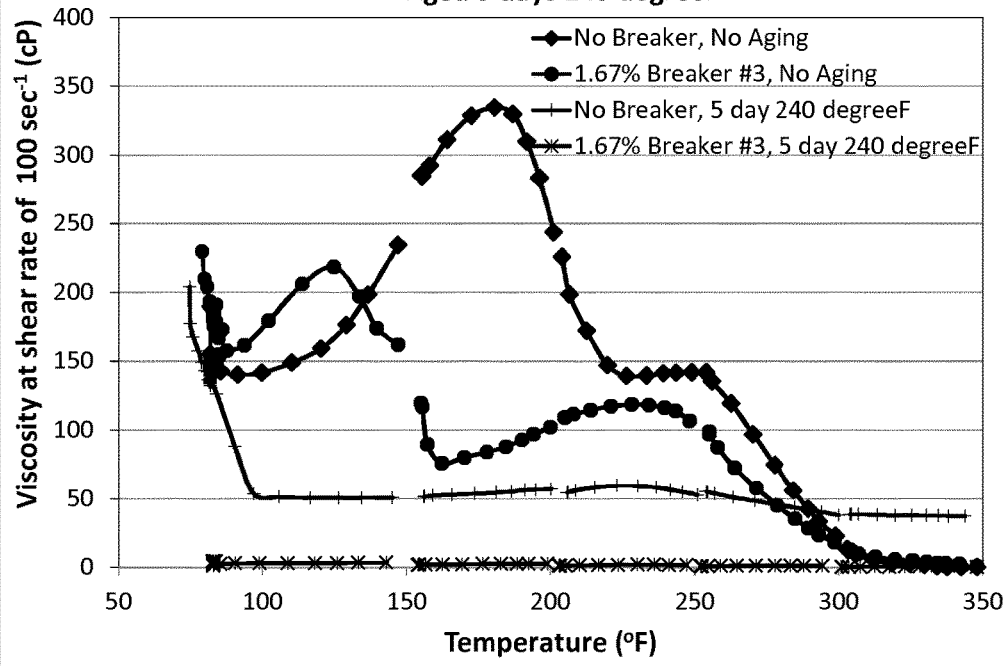

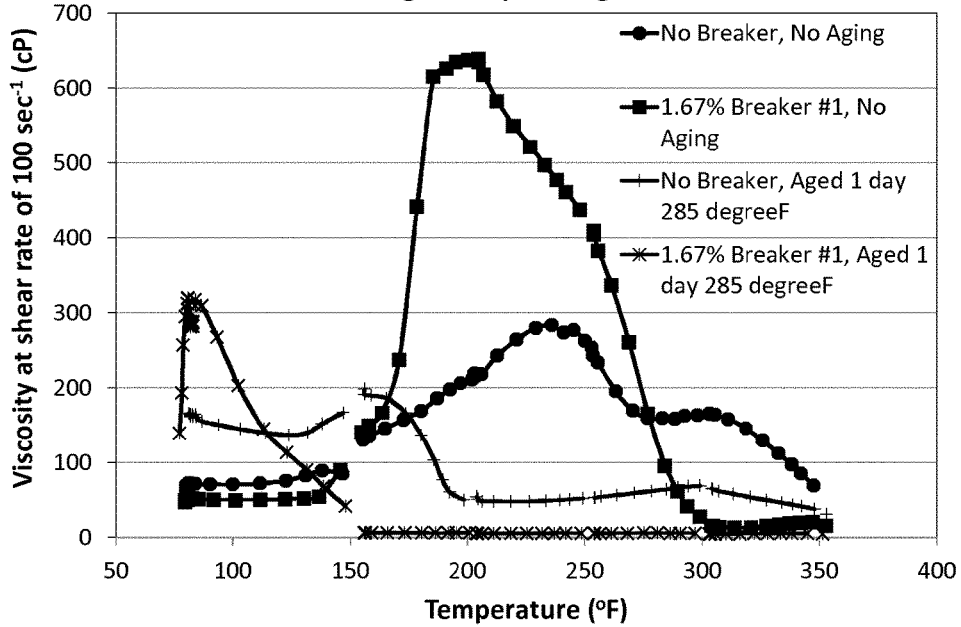
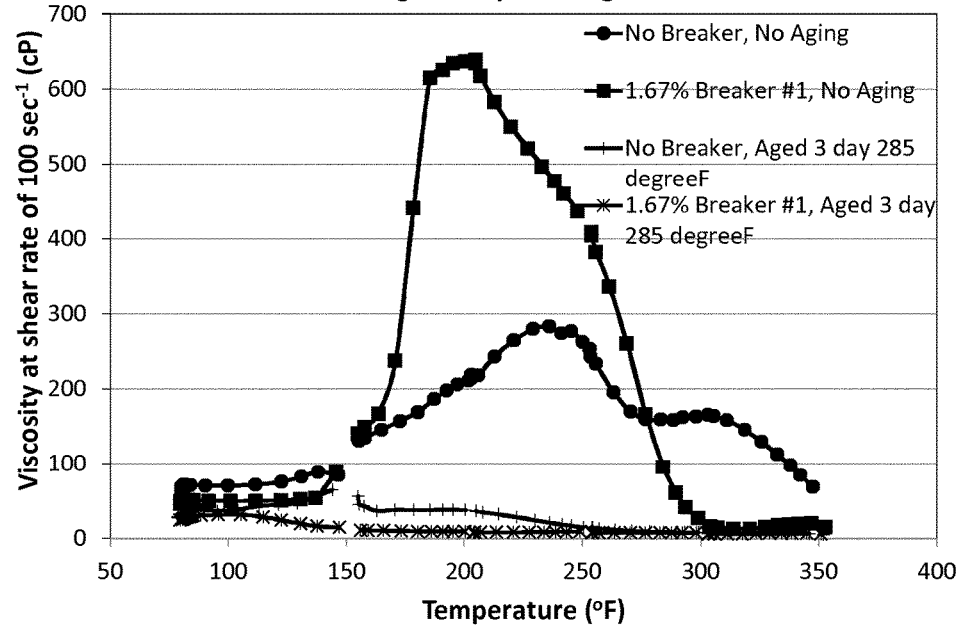

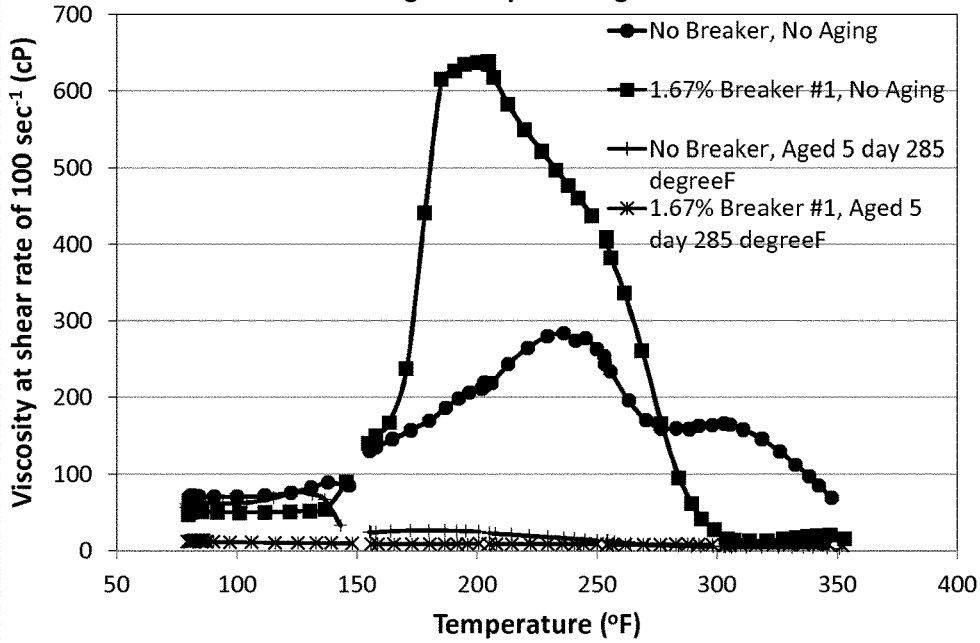
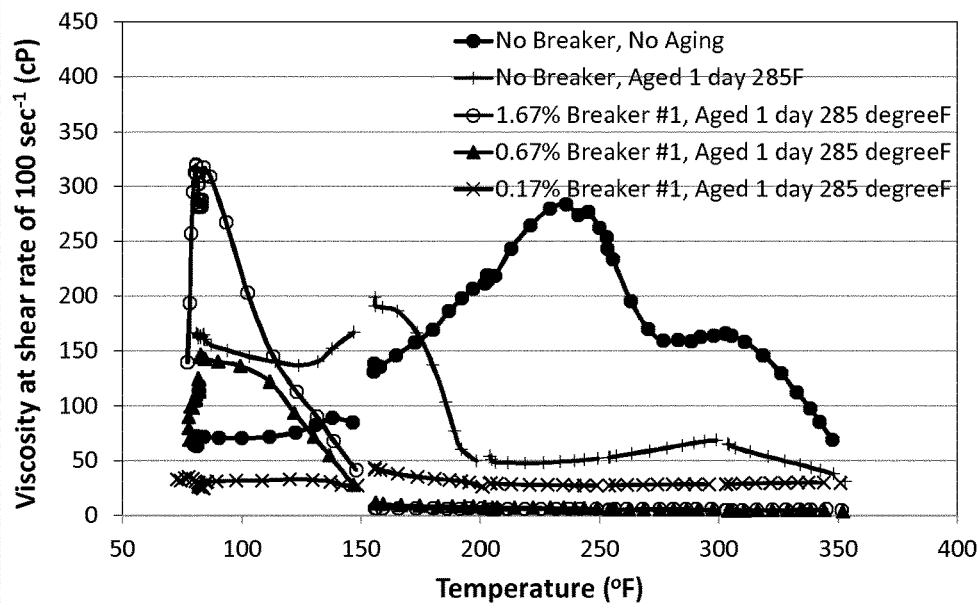

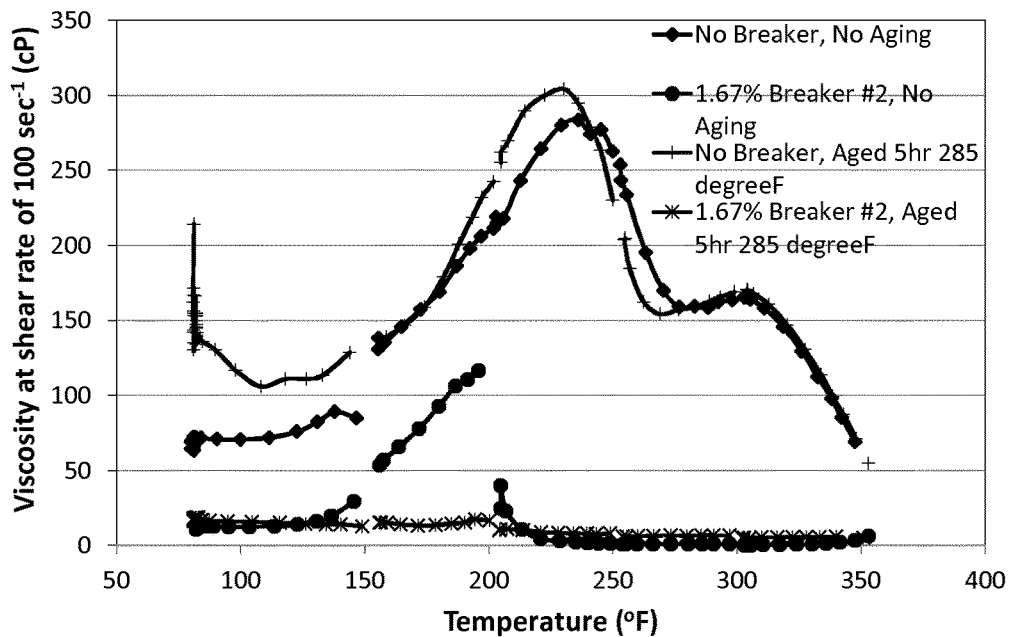
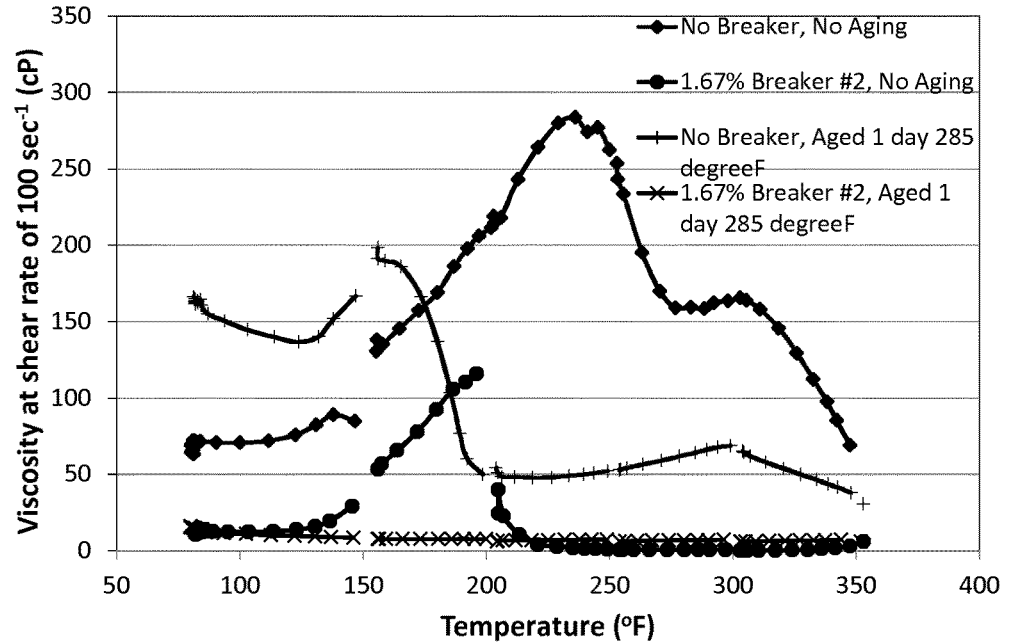

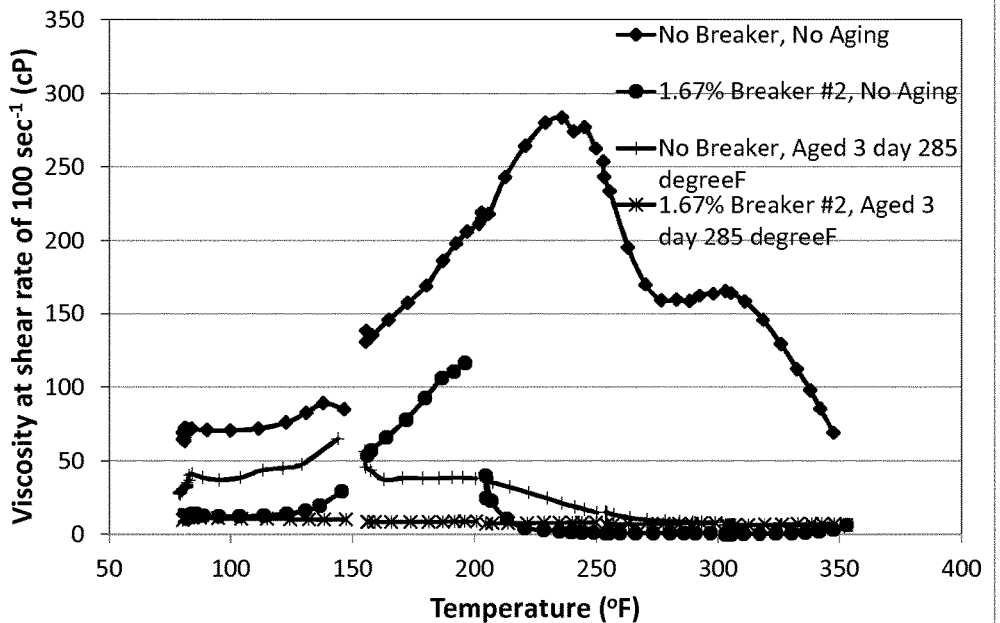
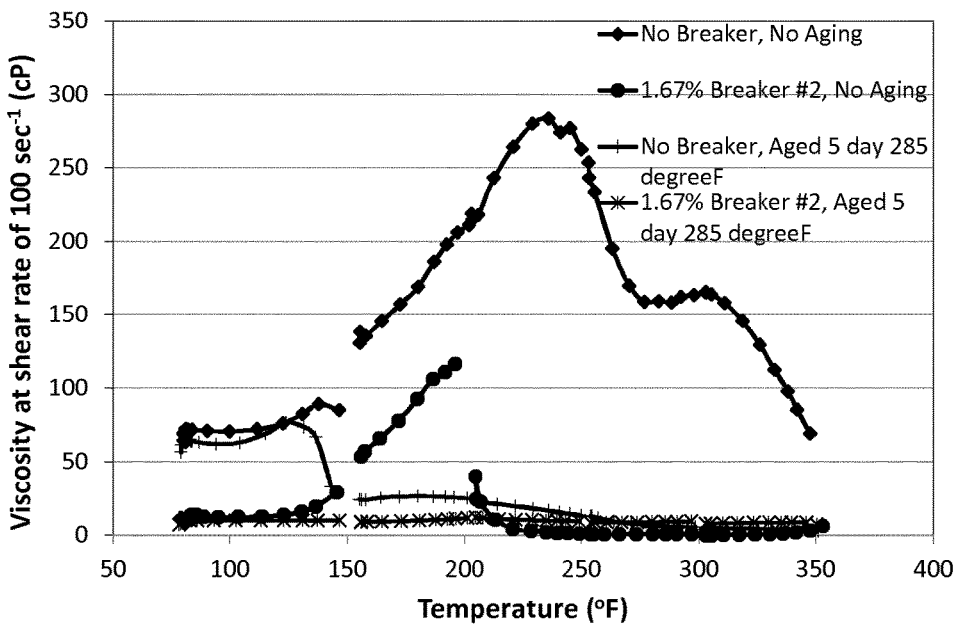

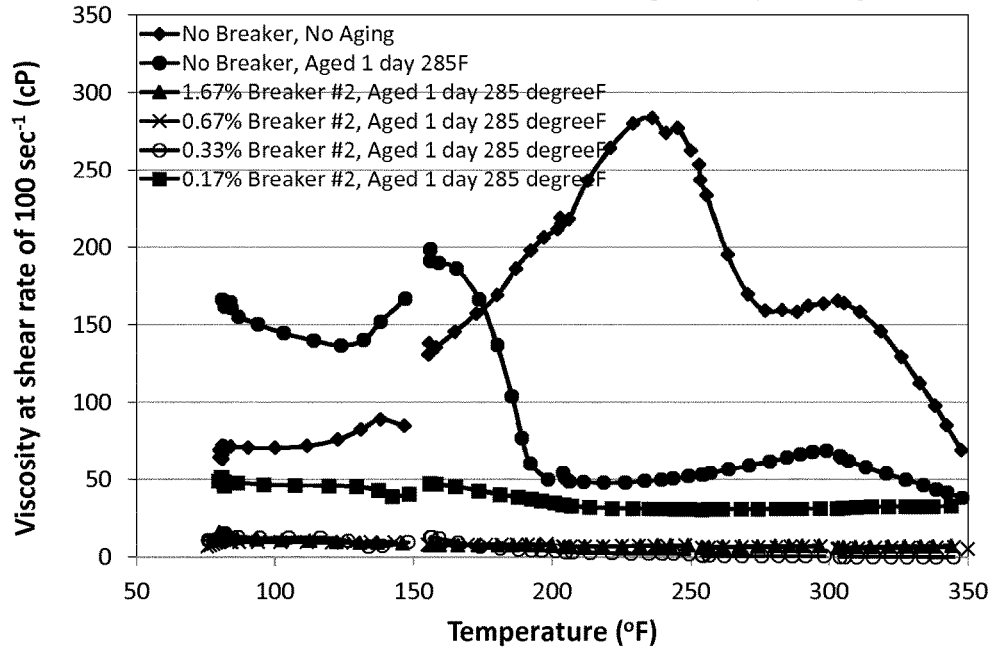
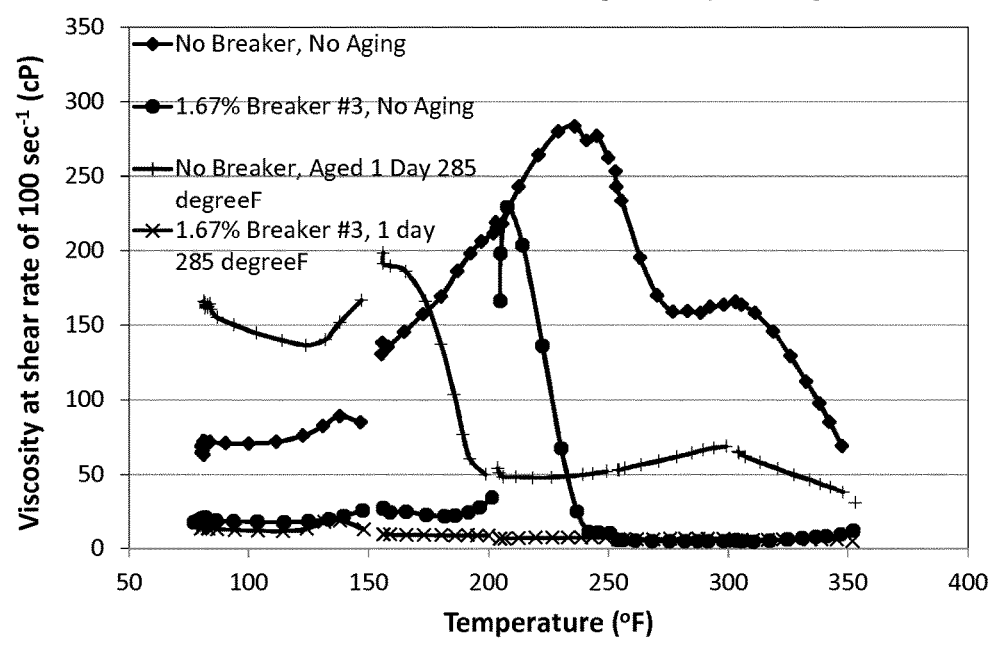

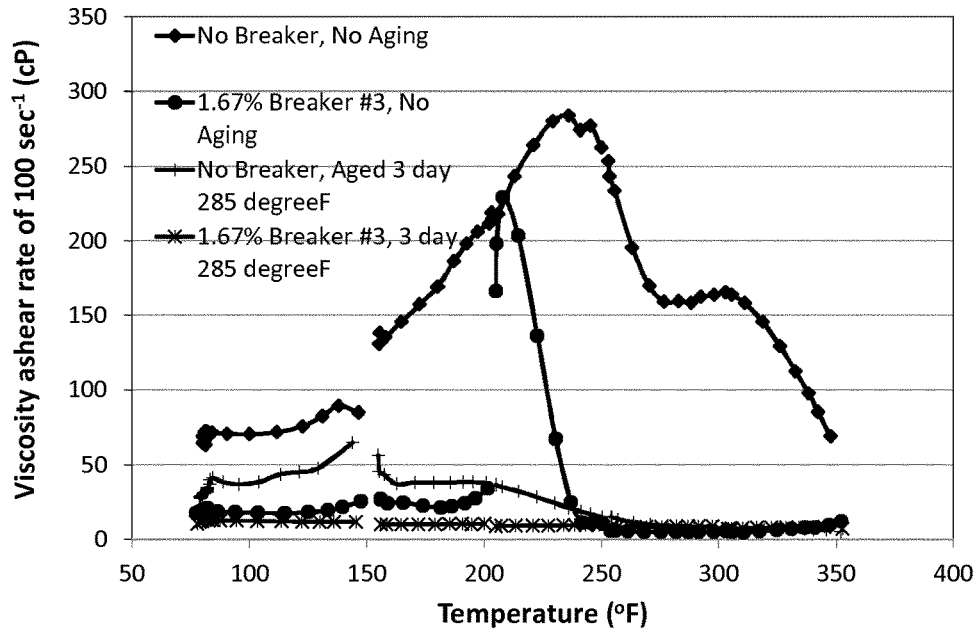
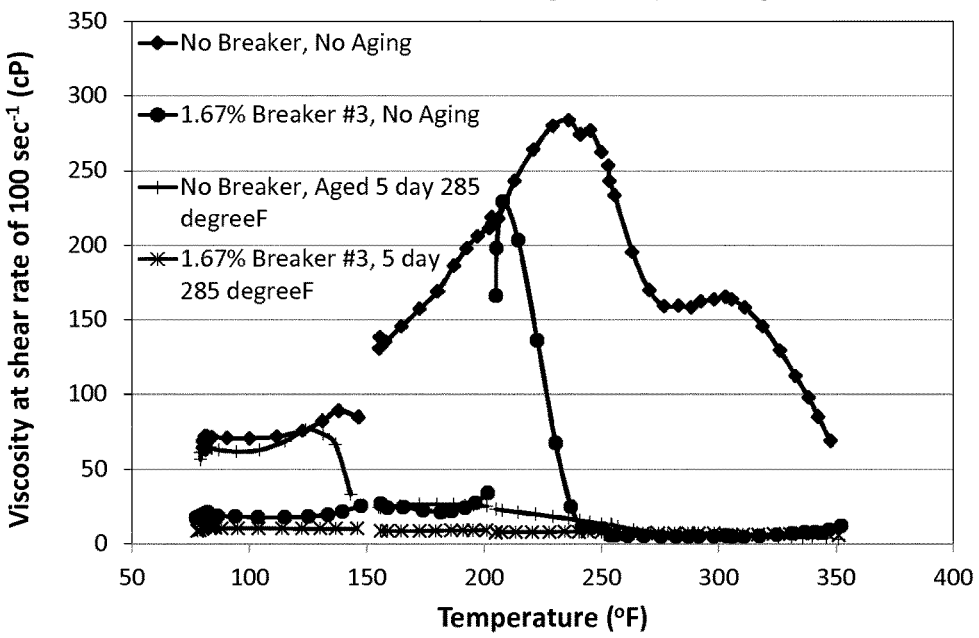

ations and in oil and gas wells.
INTERNAL POLYMERIC BREAKER FOR VISCOELASTIC SURFACTANT-BASED FLUIDS This application is a national stage filing under 35 U.S.C. § 371 of PCT/EP2015/077386, filed Nov. 23, 2015, which claims priority to U.S. Patent Application No. 62/083,611, filed Nov. 24, 2014 and European Patent Application No. 15153401.3, filed Feb. 2, 2015, the contents of each of which are each incorporated herein by reference in their entirety.

FIELD OF THE INVENTION

This invention relates to compositions and methods for facilitating the delayed breaking of viscoelastic surfactant-based fluids, used in the treatment of subterranean formations and in oil and gas wells.

BACKGROUND OF THE INVENTION

High viscosity fluids are useful in many functions conducted in subterranean formations, particularly subterranean formations that are potential sources of oil and natural gas. Such functions can include, for example, hydraulic fracturing, gravel packing, matrix acidizing, and fracture acidizing.

Viscoelastic surfactants (VES) are a class of gelling agents that have been used to provide high viscosity fluids for many such functions in subterranean formations, particularly in the recovery of oil and gas. These high viscosity fluids, known as gels, can perform functions such as acidizing, fracturing, and completion. After the desired function has been performed, there is oftentimes a need to break the gel to reduce the viscosity of the fluid to allow its removal from one or more sites in the subterranean formation.

One option to break the gel is dilution with fluids naturally present in the formation, such as crude oil hydrocarbon, condensate and formation water. In many instances, however, VES fluids in the formation are not completely broken which can make their removal difficult and impede recovery of the desired subterranean oil or gas. One method to improve the clean-up of VES fluids is to use pre-flush or post-flush fluids which may contain aromatic hydrocarbons, alcohols, mutual solvents and/or other breaking additives. One problem with the use of pre-flush or post-flush fluids is their limited interaction with the gel due to small fluid-fluid interfaces. Usually only some sections of the formation achieve the fluid-fluid interface required to break the gel and allow its removal, while in the remaining sections of the formation the gel remains unbroken. Therefore, contacting and breaking the gel with pre-flush or post-flush treatment is not always effective. Additionally, the volumes of the flushes can be high.

To efficiently break a viscosified fluid and to have a better control of breaking, it is desirable to have a delayed internal breaker which breaker can be activated by subterranean conditions to provide a controlled rate of gel viscosity reduction.

Various types of delayed internal breakers are known to reduce the viscosity of VES gels, such as acids, oxides, enzymes, and transition metals. Proper placement is a key factor for any breaker. It must have a sufficient interface with the fluid that is to be broken. Most conventional breakers cannot clean up the VES gel once the high viscosity fluid enters the formation fissures or pores, because the required interface cannot be achieved. Therefore, there exists a need for compositions and methods for breaking VES fluids under different subterranean conditions and at predetermined times.

U.S. Pat. No. 6,881,709 B2 discloses a precursor of a breaking system which reduces the viscosity of the fluid by melting, slow dissolution, and de-adsorption of a breaking agent absorbed into solid particles. In one disclosed embodiment the breaker comprises salts provided in an encapsulated form. It is possible that such a solid breaker formulation may settle out of the gel and cause an inefficient or premature break of the VES gel. Moreover, if a solid encapsulated breaker formulation is used in hydraulic fracturing, the breaker mechanism may rely on the fracture closure to crush the capsules and release the breaking salt. In that case, any high viscosity fluid that is forced out of the fracture during the closure would not be broken.

U.S. Pat. No. 7,084,095 discloses a method of treating a subterranean formation comprising the steps of injecting down a well an aqueous fluid comprising a thickening amount of a viscoelastic surfactant and providing an encapsulated polymer additive that causes a change in rheology of the fluid under downhole conditions. The patent also discloses a polymer additive for treatment of a subterranean formation wherein the polymer additive is selected from sulfonated polynaphthalenes, sulfonated polystyrenes, and sulfonated styrene/maleic anhydride polymers.

U.S. Pat. No. 7,635,028 discloses an acidic internal breaker, which can be an inorganic or organic acid. However, this approach may not be optimum in applications that are conducted at low pH. The reference additionally discloses that a corrosion inhibitor can be used with the acidic internal breaker to protect any well tubing that may be present.

U.S. Pat. No. 7,655,603 discloses a method for treating a subterranean reservoir comprising the use of an aqueous fluid gelled with a viscoelastic surfactant and a micro-emulsion, wherein the micro-emulsion comprises at least one viscosity reducing agent comprising at least one unsaturated fatty acid, at least one solubilizing agent, at least one desorption agent, and at least one water wetting agent.

U.S. Pat. No. 7,879,770 discloses an oxidative internal breaking agent and a free radical propagating agent selected from metabisulfites, reducing sugars and reducing di-, tri-, oligo- and poly-saccharides. The oxidative breaking agent can be triggered by chemical or physical conditions, such as temperature or pH. The breaking rate can be optionally accelerated or delayed. It is possible, however, that oxidizers may not always work efficiently as delayed breakers. Furthermore, it is possible that phase separation and/or precipitation may occur if a higher dosage is used.

U.S. Pat. No. 8,813,874 discloses the use of polymers containing carboxylated monomers, including HASE polymers, in a method for sealing voids and cracks in subterranean formations containing carbonate materials, wherein the polymers react with divalent cations liberated by the carbonates and forms a plug.

Thus there is a need for a delayed internal breaking agent that can be mixed with a viscoelastic surfactant, yet does not reduce the viscosity and elasticity of the VES fluid for at least several hours so that the VES fluid can perform its function. Ideally the internal breaking agent should be compatible with the VES, should move throughout the formation along with the VES, and should reduce both the viscosity and elasticity of the VES fluid at the appropriate time.

SUMMARY OF THE INVENTION

This invention relates to compositions and methods for facilitating the delayed breaking of viscoelastic surfactant-based fluids, particularly in the treatment of subterranean formations such as oil and gas wells. More specifically, this invention relates to compositions and methods for facilitating the delayed breaking of viscoelastic surfactant-based fluids, for acidizing, fracturing, and gravel packing applications.

In one aspect of the invention, a composition for facilitating the delayed breaking of a viscoelastic surfactant-based fluid comprises an aqueous fluid, a viscoelastic surfactant, and a breaking agent, the breaking agent comprising one or more hydrophobically-modified alkaline swellable emulsion polymers (HASE).

In one aspect of the invention, a method for treating a subterranean formation comprises introducing to the formation a fluid comprising an aqueous fluid, a viscoelastic surfactant, and a breaking agent, the breaking agent comprising one or more hydrophobically-modified alkaline swellable emulsion polymers, such that the fluid is in the form of a gel in the subterranean formation, and then allowing the breaking agent to act upon the gel to reduce the viscosity thereof.

In one embodiment of the invention the viscoelastic surfactant is selected from sultaines, betaines, and amidoamine oxides. In one embodiment of the invention the viscoelastic surfactant is selected from sultaines.

In one embodiment of the invention the breaker comprises a HASE polymer that is an acrylate polymer that has been modified with a hydrophobic moiety.

In one embodiment of the invention the breaker comprises a HASE polymer that is an itaconate polymer that has been modified with a hydrophobic moiety.

In one embodiment of the invention the breaker comprises a HASE polymer that is a methyl acrylic acid/ethyl acetate/methacrylate polymer that has been modified with a hydrophobic moiety.

In one embodiment of the invention the aqueous fluid comprises one or more salts. In one embodiment the aqueous fluid is a brine, being a saturated solution (at 20° C.). In one embodiment the salt is alkali metal salt. In one embodiment the salt is an alkaline earth metal salt. In one embodiment the alkali metal salt is NaCl, KCl, and/or their bromide or formate equivalents. In one embodiment the alkaline earth metal salt is $CaCl_2$ and/or its bromide or formate equivalent. In one embodiment the aqueous fluid includes a mixture of salts.

DESCRIPTION OF THE DRAWINGS

FIG. 1 is a graph of viscosity vs. temperature for compositions in accordance with Example 1 comprising a 6% sultaine viscoelastic surfactant, with and without 1.67% breaker #1, in 4% KCl brine, measured initially and after 5 days of aging at 240° F.

FIG. 2A is a graph of viscosity vs. temperature for compositions in accordance with Example 2 comprising 6% sultaine viscoelastic surfactant, with and without 1.67% breaker #2, in 4% KCl brine, measured initially and after 3 days of aging at 240° F.

FIG. 2B is a graph of viscosity vs. temperature for compositions in accordance with Example 2 comprising 6% sultaine viscoelastic surfactant, with and without 1.67% breaker #2, in 4% KCl brine, measured initially and after 5 days of aging at 240° F.

FIG. 3A is a graph of viscosity vs. temperature for compositions in accordance with Example 3 comprising 6% sultaine viscoelastic surfactant, with and without 1.67% breaker #3, in 4% KCl brine, measured initially and after 3 days of aging at 240° F.

FIG. 3B is a graph of viscosity vs. temperature for compositions in accordance with Example 3 comprising 6% sultaine viscoelastic surfactant, with and without 1.67% breaker #3, in 4% KCl brine, measured initially and after 5 days of aging at 240° F.

FIG. 4A is a graph of viscosity vs. temperature for compositions in accordance with Example 4 comprising 6% sultaine viscoelastic surfactant, with and without 1.67% breaker #1, in 30% $CaCl_2$ brine, measured initially and after 1 day of aging at 285° F.

FIG. 4B is a graph of viscosity vs. temperature for compositions in accordance with Example 4 comprising 6% sultaine viscoelastic surfactant, with and without 1.67% breaker #1, in 30% $CaCl_2$ brine, measured initially and after 3 days of aging at 285° F.

FIG. 4C is a graph of viscosity vs. temperature for compositions in accordance with Example 4 comprising 6% sultaine viscoelastic surfactant, with and without 1.67% breaker #1, in 30% $CaCl_2$ brine, measured initially and after 5 days of aging at 285° F.

FIG. 5 is a graph of viscosity vs. temperature for compositions in accordance with Example 5 comprising 6% sultaine viscoelastic surfactant, with and without breaker #1, in 30% $CaCl_2$ brine, measured initially and after 1 day of aging at 285° F. The amount of breaker #1 in the compositions varied from 1.67% to 0.67% to 0.17%.

FIG. 6A is a graph of viscosity vs. temperature for compositions in accordance with Example 6 comprising 6% sultaine viscoelastic surfactant, with and without 1.67% breaker #2, in 30% $CaCl_2$ brine, measured initially and after 5 hours of aging at 285° F.

FIG. 6B is a graph of viscosity vs. temperature for compositions in accordance with Example 6 comprising 6% sultaine viscoelastic surfactant, with and without 1.67% breaker #2, in 30% $CaCl_2$ brine, measured initially and after 1 day of aging at 285° F.

FIG. 6C is a graph of viscosity vs. temperature for compositions in accordance with Example 6 comprising 6% sultaine viscoelastic surfactant, with and without 1.67% breaker #2, in 30% $CaCl_2$ brine, measured initially and after 3 days of aging at 285° F.

FIG. 6D is a graph of viscosity vs. temperature for compositions in accordance with Example 6 comprising 6% sultaine viscoelastic surfactant, with and without 1.67% breaker #2, in 30% $CaCl_2$ brine, measured initially and after 5 days of aging at 285° F.

FIG. 7 is a graph of viscosity vs. temperature for compositions in accordance with Example 7 comprising 6% sultaine viscoelastic surfactant, with and without breaker #2, in 30% $CaCl_2$ brine, measured after 1 day of aging at 285° F. The amount of breaker #2 in the compositions varied from 1.67% to 0.67% to 0.33% to 0.17%.

FIG. 8A is a graph of viscosity vs. temperature for compositions in accordance with Example 8 comprising 6% sultaine viscoelastic surfactant, with and without 1.67% breaker #3, in 30% $CaCl_2$ brine, measured initially and after 1 day of aging at 285° F.

FIG. 8B is a graph of viscosity vs. temperature for compositions in accordance with Example 8 comprising 6% sultaine viscoelastic surfactant, with and without 1.67% breaker #3, in 30% $CaCl_2$ brine, measured initially and after 3 days of aging at 285° F.

FIG. 8C is a graph of viscosity vs. temperature for compositions in accordance with Example 8 comprising 6% sultaine viscoelastic surfactant, with and without 1.67% breaker #3, in 30% CaCl$_2$ brine, measured initially and after 5 days of aging at 285° F.

DETAILED DESCRIPTION OF THE INVENTION

In one aspect of the invention, an oilfield treatment composition comprises an aqueous fluid, a viscoelastic surfactant and a delayed breaker. The viscoelastic surfactant will act on the treatment composition to form a VES-based gel. The breaker should stay with the VES-based gel to enable an efficient and complete break. One advantage of the present invention is that delayed breaking of the VES-based gel can be achieved without sacrificing the initial fluid viscosity, for example, as required for gravel packing and hydraulic fracturing. In addition, the breaking rate can be controlled in a desired period. The breaking will not efficiently start until the desired function of the VES-based gel is accomplished.

The composition and method of the present invention find utility in hydraulic fracturing, gravel packing, matrix acidizing and fracture acidizing, although it is to be understood that the invention may be used in many other applications.

In hydraulic fracturing, the viscoelastic surfactant-based fluids create channels or fractures in oil-producing reservoir zones in order to improve oil production by providing a high permeability pathway from the reservoir rock to the well bore. Typically, fracturing fluids are pumped at pressures exceeding the overburden weight of the rock formation thereby causing splits and fractures in the formation rock. Conventional proppants can be added to the fluid to prevent the induced fractures from closing after the pumping phase is over by propping open the induced splits and fractures. Gelling agents can be added to the fluid to transport the proppants and to reduce fluid leakoff.

The invention is especially useful in gravel packing, where high density viscous fluids are used to place prepared gravel of a specific size in a surrounding annulus to minimize sand production. Gravel packing involves the use of heavy brine which can comprise monovalent salts, divalent salts, and mixtures thereof. Usually, bromide or formate salts are used to make high density brine for deep well applications.

There are two types of acid treatment: fracture acidizing, in which acid is injected at rates above fracture pressure to etch the faces of the resultant fractures, and matrix acidizing in which acid is injected at rates below fracture pressure to dissolve flow channels in the rock or to remove scale or damage caused by drilling. Acids suitable for use in these treatment techniques include, but are not limited to, hydrochloric, hydrofluoric, fluoroboric, acetic and formic acids and mixtures thereof, and those acids in the form of acid-oil emulsions. The acids can contain some additives, such as corrosion inhibitors, and iron control agents. Self-diverting and delayed acids can be gelled with suitable viscoelastic surfactants.

In one embodiment of the invention a fluid composition comprises an aqueous fluid, a viscoelastic surfactant, and a delayed breaker comprising one or more hydrophobically modified alkali swellable emulsion polymers. Such polymers are referred to herein as HASE polymers. HASE polymers are known as rheology modifiers typically used for increasing the viscosity of aqueous solutions, and are known to be useful as thickeners in a variety of applications, including paints, industrial cleaners, household cleaners, and adhesives. It was therefore surprising to find that such polymers, when added to viscoelastic surfactants, would cause a delayed breaking of the viscoelastic gel and a resultant decrease in viscosity.

HASE polymers are disclosed, for example, in U.S. Pat. No. 6,063,857 and U.S. Pat. No. 7,288,616, both of which are incorporated herein by reference. HASE polymers typically are copolymers which contain an anionic group comprising anionic monomers, a non-ionic group comprising non-ionic monomers, and a hydrophobic group comprising associative monomers.

In one embodiment the anionic monomers are selected from acidic polymerizable, ethylenically unsaturated monomers preferably containing at least one carboxylic acid group, sulfonic acid group, or phosphonic acid group to provide an acidic or anionic functional site; the nonionic monomers are selected from water insoluble copolymerizable, ethylenically unsaturated monomers; and the associative monomers have an ethylenically unsaturated end group portion, a hydrophilic middle portion, and a hydrophobic end portion.

The HASE polymers as used in the composition and method of the present invention can be prepared by polymerizing a monomer mixture comprising at least one anionic monomer or salt thereof, at least one non-ionic monomer or salt thereof, and at least one associative monomer or salt thereof.

In one embodiment the acidic monomer or salt thereof preferably comprises at least about 10 weight percent of the total monomer mixture, in one embodiment at least about 25 weight percent of the total monomer mixture, and in one embodiment at least about 30 weight percent of the total monomer mixture, on a total monomer mixture weight basis. In one embodiment the acidic monomer comprises up to about 75 weight percent of the total monomer mixture, in one embodiment up to about 65 weight percent, and in one embodiment up to about 60 weight percent, on a total monomer mixture weight basis.

In one embodiment the nonionic monomer or salt thereof preferably comprises at least about 10 weight percent of the total monomer mixture, in one embodiment at least about 25 weight percent, and in one embodiment at least about 30 weight percent, on a total monomer mixture weight basis. In one embodiment the nonionic monomer comprises up to about 90 weight percent of the total monomer mixture, in one embodiment up to about 75 weight percent, and in one embodiment up to about 60 weight percent, on a total monomer mixture weight basis.

In one embodiment the associative monomer components in the monomer mixture independently comprise, on a total monomer mixture weight basis, at least about 0.1 weight percent of the total monomer mixture, in one embodiment at least about 0.25 weight percent, and in one embodiment at least about 0.5 weight percent. In one embodiment the associative monomer components in the monomer mixture independently comprise, on a total monomer mixture weight basis, up to about 25 weight percent of the monomer mixture, in one embodiment up to about 20 weight percent, and in one embodiment up to about 15 weight percent, on a total monomer mixture weight basis.

The term "alkyl" as used herein shall mean a substituted or unsubstituted, saturated or unsaturated, branched or linear or cyclic aliphatic hydrocarbon moiety.

Modifiers of the form "$C_x$-$C_y$" designate that the indicated moiety has a total of x to y carbon atoms, where x and y are specified integers.

Acidic Monomer

As described in U.S. Pat. No. 7,288,616, acidic monomers suitable for use in the present invention are acidic, polymerizable, ethylenically unsaturated monomers preferably containing at least one carboxylic acid group, sulfonic acid group, or phosphonic acid group to provide an acidic or anionic functional site. These acid groups can be derived from monoacids or diacids, anhydrides of dicarboxylic acids, monoesters of diacids, and salts thereof.

Suitable acidic carboxylic acid-containing monomers include, but are not limited to: acrylic acid, methacrylic acid, itaconic acid, citraconic acid, maleic acid, fumaric acid, crotonic acid, aconitic acid, and the like, and $C_1$-$C_{18}$ alkyl-monoesters of maleic, fumaric, itaconic, or aconitic acid, such as methyl hydrogen maleate, monoisopropyl maleate, butyl hydrogen fumarate, and the like. Anhydrides of dicarboxylic acids, such as maleic anhydride, itaconic anhydride, citraconic anhydride, and the like can also be used as acidic monomers. Such anhydrides generally hydrolyze to the corresponding diacids upon prolonged exposure to water, or at elevated pH.

Suitable sulfonic acid group-containing monomers include, but are not limited to: vinyl sulfonic acid, 2-sulfoethyl methacrylate, styrene sulfonic acid, 2-acrylamido-2-methylpropane sulfonic acid (AMPS), allyloxybenzene sulfonic acid, and the like. Particularly preferred are the sodium salt of styrene sulfonic acid (SSSA) and AMPS.

Non-limiting examples of suitable phosphonic acid group-containing monomers include vinyl phosphonic acid, allyl phosphonic acid, 3-acrylamidopropyl phosphonic acid, and the like.

Suitable salts include, without limitation thereto, alkali metal salts, such as sodium, potassium and lithium salts; alkaline earth metal salts, such as calcium and magnesium salts; ammonium salts; and alkyl-substituted ammonium salts, such as salts of 2-amino-2-methyl-1-propanol (AMP), ethanolamine, diethanolamine, triethanolamine, triethylamine, and the like.

The foregoing monomers or salts thereof can be used as the acidic monomer component of the HASE polymers used in the present invention, individually, or in mixtures of two or more. Acrylic acid, methacrylic acid, the sodium salt of styrene sulfonic acid (SSSA), AMPS as well as fumaric acid, maleic acid, itaconic acid, and monoesters or monoamides thereof, are preferred. Particularly preferred acidic vinyl monomers are acrylic and methacrylic acid, SSSA, and AMPS.

Nonionic Monomer

Further as described in U.S. Pat. No. 7,288,616, nonionic monomers suitable for use in the present invention are copolymerizable, nonionic, ethylenically unsaturated monomers, which are well known in the art. Preferred nonionic monomers have either of the following formulas

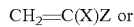  (I)

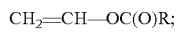  (II)

wherein, in each of formulas (I) and (II),

X is H or methyl;

Z is —C(O)OR$^1$, —C(O)NH$_2$, —C(O)NHR$^1$, —C(O)N(R$^1$)$_2$, —C$_6$H$_4$R$^1$, —C$_6$H$_4$OR$^1$, —C$_6$H$_4$Cl, —CN, —NHC(O)CH$_3$, —NHC(O)H, N-(2-pyrrolidonyl), N-caprolactamyl, —C(O)NHC(CH$_3$)$_3$, —C(O)NHCH$_2$CH$_2$—N-ethyleneurea, —SiR$_3$, —C(O)O(CH$_2$)$_x$SiR$_3$, —C(O)NH(CH$_2$)$_x$SiR$_3$, or —(CH$_2$)$_x$SiR$_3$; where x is an integer in the range of 1 to about 6;

each R is independently $C_1$-$C_{18}$ alkyl; and
each R$^1$ is independently $C_1$-$C_{30}$ alkyl, hydroxy-substituted $C_1$-$C_{30}$ alkyl, or halogen-substituted $C_1$-$C_{30}$ alkyl.

Non-limiting examples of suitable water-insoluble, nonionic monomers include $C_1$-$C_{30}$ alkyl (meth)acrylates; $C_1$-$C_{30}$ hydroxyalkyl esters of (meth)acrylic acid; $C_1$-$C_{30}$ alkyl (meth)acrylamides; styrene; substituted styrenes, such as vinyl toluene (e.g., 2-methyl styrene), butyl styrene, isopropyl styrene, p-chloro styrene, and the like; vinyl esters, such as vinyl acetate, vinyl butyrate, vinyl caprolate, vinyl pivalate, vinyl neodecanoate, and the like; unsaturated nitriles, such as methacrylonitrile, acrylonitrile, and the like and unsaturated silanes, such as trimethylvinylsilane, dimethylethylvinylsilane, allyldimethylphenylsilane, allytrimethylsilane, 3-acrylamidopropyltrimethylsilane, 3-trimethylsilylpropyl methacrylate, and the like.

Other non-limiting examples of suitable water-insoluble non-ionic monomers include butadiene, isoprene, vinyl chloride, vinylidene chloride, and the like.

Particularly preferred nonionic monomers include $C_1$-$C_{18}$ alkyl esters of acrylic acid and of methacrylic acid, methacrylamidoethyl-N-ethylene urea, and combinations thereof.

Associative Monomer

Associative monomers suitable for use in the present invention are compounds comprising (i) an ethylenically unsaturated end group portion for addition polymerization with the other monomers of the system; (ii) an optional polyoxyalkylene midsection portion for imparting selective hydrophilic properties to the polymer; and (iii) a hydrophobic end group portion for providing selective hydrophobic properties to the polymer.

The portion (i) supplying the ethylenically unsaturated end group preferably is derived from an α,β-ethylenically unsaturated mono or di-carboxylic acid or the anhydride thereof, more preferably a C$_3$ or C$_4$ mono- or di-carboxylic acid or the anhydride thereof. Alternatively, portion (i) of the associative monomer is derived from an allyl ether or vinyl ether; a nonionic vinyl-substituted urethane monomer, such as disclosed in U.S. Reissue Pat. No. 33,156 or U.S. Pat. No. 5,294,692; or a vinyl-substituted urea reaction product, such as disclosed in U.S. Pat. No. 5,011,978; the relevant disclosures of each of which are incorporated herein by reference.

The midsection portion (ii) is preferably a polyoxyalkylene segment of at least 5 repeating C$_2$-C$_7$ alkylene oxide units, in one embodiment at least about 10, in one embodiment at least about 15, in one embodiment up to about 250, in one embodiment up to about 120, and in one embodiment up to about 60 repeating C$_2$-C$_7$ alkylene oxide units. Preferred midsection portions (ii) include polyoxyethylene, polyoxypropylene, and polyoxybutylene segments comprising at least about 5 ethylene oxide, propylene oxide or butylene oxide units, in one embodiment at least about 10, in one embodiment at least about 15, in one embodiment up to about 150, in one embodiment up to about 100, and in one embodiment up to about 60 ethylene oxide, propylene oxide or butylene oxide units, and random or non-random sequences of ethylene oxide, propylene oxide and/or butylene oxide units.

The hydrophobic end group portion (iii) of the associative monomers is preferably a hydrocarbon moiety belonging to one of the following hydrocarbon classes: a C$_8$-C$_{40}$ linear alkyl, an aryl-substituted C$_2$-C$_{40}$ alkyl, a C$_2$-C$_{40}$ alkylsubstituted phenyl, a C$_8$-C$_{40}$ branched alkyl, a C$_8$-C$_{40}$ carbocyclic alkyl; and a C$_8$-C$_{80}$ complex ester.

As used herein and in the appended claims, the term "complex ester" means a di-, tri-, or polyester of a polyol such as a sugar, having at least one hydroxyl group capable of being alkylated with a C$_2$-C$_7$ alkylene oxide. The term "complex ester" includes, in particular, the complex hydrophobes described by Jenkins et al. in U.S. Pat. No. 5,639,841, the relevant disclosure of which is incorporated herein by reference.

Non-limiting examples of suitable hydrophobic end group portions (iii) of the associative monomers are linear or branched alkyl groups having about 8 to about 40 carbon atoms, such as capryl ($C_8$), iso-octyl (branched $C_8$), decyl ($C_{10}$), lauryl ($C_{12}$), myristyl ($C_{14}$), cetyl ($C_{16}$), cetearyl ($C_{16}$-$C_{18}$), stearyl ($C_{18}$), isostearyl (branched $C_{18}$), arachidyl ($C_{20}$), behenyl ($C_{22}$), lignoceryl ($C_{24}$), cerotyl ($C_{26}$), montanyl ($C_{28}$), melissyl ($C_{30}$), lacceryl ($C_{32}$), and the like.

Examples of linear and branched alkyl groups having about 8 to about 40 carbon atoms that are derived from a natural source include, without being limited thereto, alkyl groups derived from hydrogenated peanut oil, soybean oil and canola oil (all predominately $C_{18}$), hydrogenated tallow oil ($C_{16}$-$C_{18}$), and the like; and hydrogenated $C_{10}$-$C_{30}$ terpenols, such as hydrogenated geraniol (branched $C_{10}$), hydrogenated farnesol (branched $C_{15}$), hydrogenated phytol (branched $C_{20}$), and the like.

Non-limiting examples of suitable $C_2$-$C_{40}$ alkyl-substituted phenyl groups include octylphenyl, nonylphenyl, decylphenyl, dodecylphenyl, hexadecylphenyl, octadecylphenyl, isooctylphenyl, sec-butylphenyl, and the like. Suitable $C_8$-$C_{40}$ carbocyclic alkyl groups include, without being limited thereto, groups derived from sterols from animal sources, such as cholesterol, lanosterol, 7-dehydrocholesterol, and the like; from vegetable sources, such as phytosterol, stigmasterol, campesterol, and the like; and from yeast sources, such as ergosterol, mycosterol, and the like. Other carbocyclic alkyl hydrophobic end groups useful in the present invention include, without being limited thereto, cyclooctyl, cyclododecyl, adamantyl, decahydronaphthyl, and groups derived from natural carbocyclic materials, such as pinene, hydrogenated retinol, camphor, isobornyl alcohol, and the like.

Exemplary aryl-substituted $C_2$-$C_{40}$ alkyl groups include, without limitation thereto, styryl (e.g., 2-phenylethyl), distyryl (e.g., 2,4-diphenylbutyl), tristyryl (e.g., 2,4,6-triphenylhexyl), 4-phenylbutyl, 2-methyl-2-phenylethyl, tristyrylphenolyl, and the like.

Non-limiting examples of suitable $C_8$-$C_{80}$ complex esters include hydrogenated castor oil (predominately the triglyceride of 12-hydroxystearic acid); 1,2-diacyl glycerols, such as 1,2-distearyl glycerol, 1,2-dipalmityl glycerol, 1,2-dimyristyl glycerol, and the like; di-, tri-, or poly-esters of sugars, such as 3,4,6-tristearyl glucose, 2,3-dilauryl fructose, and the like; and sorbitan esters, such as those disclosed in U.S. Pat. No. 4,600,761 to Ruffner et al., the pertinent disclosures of which are incorporated herein by reference.

Useful associative monomers can be prepared by any method known in the art. See, for example, U.S. Pat. No. 4,421,902 to Chang et al.; U.S. Pat. No. 4,384,096 to Sonnabend; U.S. Pat. No. 4,514,552 to Shay et al.; U.S. Pat. No. 4,600,761 to Ruffner et al.; U.S. Pat. No. 4,616,074 to Ruffner; U.S. Pat. No. 5,294,692 to Barron et al.; U.S. Pat. No. 5,292,843 to Jenkins et al.; U.S. Pat. No. 5,770,760 to Robinson; and U.S. Pat. No. 5,412,142 to Wilkerson, III et al.; the pertinent disclosures of which are incorporated herein by reference.

Examples of preferred associative monomers include those having formula (III).

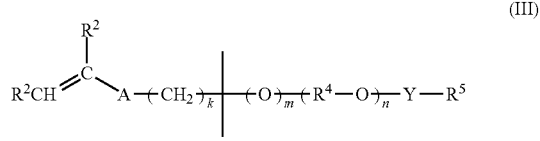

(III)

wherein
each $R^2$ is independently selected from H, methyl, —C(O)OH, and —C(O)OR$^3$, where $R^3$ is $C_1$-$C_{30}$ alkyl;
A is selected from —CH$_2$C(O)O—, —C(O)O—, —O—, —CH$_2$O—, —NHC(O)NH—, —C(O)NH—, —Ar(CE$_2$)$_z$NHC(O)O—, —Ar(CE$_2$)$_z$NHC(O)NH—, and —CH$_2$CH$_2$NHC(O)—; where Ar is a divalent arylene, E is H or methyl, and z is 0 or 1;
k is an integer in the range of 0 to about 30;
m is 0 or 1, with the proviso that when k is 0, m is 0, and when k is in the range of 1 to about 30, m is 1;
(R$^4$—O)$_n$ is a polyoxyalkylene, which is a homopolymer, a random copolymer, or a block copolymer of —C$_2$-C$_4$— oxyalkylene units, wherein $R^4$ is —C$_2$H$_4$—, —C$_3$H$_6$—, or —C$_4$H$_8$—, and n is an integer of at least about 5, in one embodiment at least about 10, and in one embodiment at least about 15, in one embodiment up to about 250, in one embodiment up to about 100, in one embodiment up to about 80, and in one embodiment up to about 60;
Y is selected from —R$^4$O—, —R$^4$NH—, —C(O)—, —C(O)NH—, —R$^4$NHC(O)NH—, and —C(O)NHC(O)—, where $R^4$ is defined as above; and
$R^5$ is a substituted or unsubstituted saturated or unsaturated alkyl selected from the group consisting of a $C_8$-$C_{40}$ linear alkyl, a $C_8$-$C_{40}$ branched alkyl, a $C_8$-$C_{40}$ carbocyclic alkyl, a $C_2$-$C_{40}$ alkyl-substituted phenyl, an aryl-substituted $C_2$-$C_{40}$ alkyl, and a $C_8$-$C_{80}$ complex ester; wherein $R^5$ is optionally substituted with one or more substituents selected from the group consisting of a hydroxyl group, an alkoxyl group, and a halogen group.

Particularly preferred associative monomers of formula (III) include cetyl polyethoxylated methacrylate (CEM), cetearyl polyethoxylated methacrylate (CSEM), stearyl polyethoxylated (meth)acrylate, arachidyl polyethoxylate (meth)acrylate, behenyl polyethoxylated methacrylate (BEM), cerotyl polyethoxylated (meth)acrylate, montanyl polyethoxylated (meth)acrylate, melissyl polyethoxylated (meth)acrylate, lacceryl polyethoxylated (meth)acrylate, tristyrylphenol polyethoxylated methacrylate (TEM), hydrogenated castor oil polyethoxylated methacrylate (HCOEM), canola polyethoxylated (meth)acrylate, and cholesterol polyethoxylated methacrylate (CHEM), where the polyethoxylated portion of the monomer comprises about 5 to about 100, preferably about 10 to about 80, and more preferably about 15 to about 60 ethylene oxide repeating units.

In one embodiment of the invention the breaker comprises a HASE polymer that is an acrylate polymer that has been modified with a hydrophobic moiety.

In one embodiment of the invention the breaker comprises a HASE polymer that is an itaconate polymer that has been modified with a hydrophobic moiety.

In one embodiment of the invention the breaker comprises a HASE polymer that is a methyl acrylic acid/ethyl acetate/methacrylate polymer that has been modified with a hydrophobic moiety.

Certain polymers sold under the trademark ALCOGUM® and available from Akzo Nobel Surface Chemistry LLC, Chicago, Ill. are HASE polymers suitable for use in the method and composition of the present invention.

In one embodiment the aqueous fluid can be a brine composition that comprises one or more salts. In one embodiment the brine is a saturated solution (at 20° C.). The brine can be either a light brine or a heavy brine depending on the function to be performed by the fluid, as is known in the art. In an embodiment the salt is alkali metal salt. In an embodiment the salt is an alkaline earth metal salt. In an embodiment the alkali metal salt is NaCl, KCl, and/or their bromide or formate equivalents. In an embodiment the alkaline earth metal salt is $CaCl_2$. and/or its bromide or formate equivalent. In an embodiment the brine contains one or more monovalent and/or divalent cations, such as $Na^+$, $K^+$, $Ca^{2+}$, $Mg^{2+}$ or $Zn^{2+}$. Suitable salts for use in the brines used in this invention include without limitation, NaCl, NaBr, $CaCl_2$, and KCl.

Viscoelastic Surfactants (VES)

The viscoelastic surfactants included in the present invention may comprise any suitable surfactant that is able to impart viscoelastic properties to an aqueous fluid. The surfactants may be zwitterionic, cationic, anionic, or amphoteric in nature. The delayed breakers of this invention have been found to be particularly useful when used with several types of zwitterionic surfactants, including but not limited to betaines, sultaines, and amidoamine oxides.

Sultaines have the general formula:

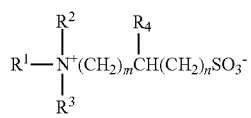

(IV)

wherein $R^1$ can be either a saturated or unsaturated hydrocarbon group of from about 12 to about 30 carbon atoms, or $R^1$ can be in the form of $RCONH(CH_2)_k$ wherein R is a saturated or unsaturated, hydrocarbon group of at least about 17 carbon atoms, in one embodiment at least about 18, in one embodiment up to about 29 carbon atoms, in one embodiment up to about 21 carbon atoms, in one embodiment a fatty aliphatic derived from natural fats or oils, and k is an integer of at least 2, in one embodiment up to 20, in one embodiment up to 12, in one embodiment up to 6, and in one embodiment up to 4; $R^2$ and $R^3$ are each independently selected from a straight chain or branched alkyl or hydroxyalkyl group of from 1 to about 6 carbon atoms, in another embodiment, of 1 to 4 carbon atoms and still another embodiment from 1 to 3 carbon atoms; $R^4$ is selected from H, hydroxyl, alkyl or hydroxyalkyl groups of from 1 to about 4 carbon atoms, in one embodiment $R^4$ is selected from ethyl, hydroxyethyl, —OH or methyl; m is an integer of from 1-20, in another embodiment 1-12, and in still another embodiment 1-6, and in still another embodiment 1-3; and n is an integer of from 0-20, in another embodiment 0-12, and in still another embodiment 0-6, and in still another embodiment 0-1.

In one embodiment, the viscoelastic surfactant is a sultaine having a formula (IVa):

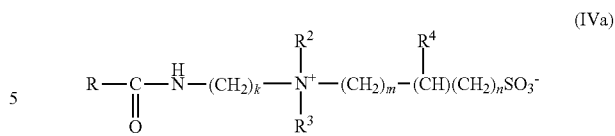

(IVa)

wherein R is a saturated or unsaturated, hydrocarbon group of from about 17 to about 29 carbon atoms, in one embodiment from about 18 to about 21 carbon atoms. In one embodiment, R is a fatty aliphatic derived from natural fats or oils having an iodine value of from about 1 to about 140, in one embodiment from about 30 to about 90, and in one embodiment from 40 to about 70. R may be restricted to a single chain length or may be of mixed chain length such as those groups derived from natural fats and oils or petroleum stocks. Tallow alkyl, hardened tallow alkyl, rapeseed alkyl, hardened rapeseed alkyl, tall oil alkyl, hardened tall oil alkyl, coco alkyl, oleyl, erucyl and soya alkyl can be used for R. $R^2$ and $R^3$ are each independently selected from a straight chain or branched alkyl or hydroxyalkyl group of from 1 to about 6 carbon atoms, in another embodiment, of 1 to 4 carbon atoms and still another embodiment from 1 to 3 carbon atoms. $R^4$ is selected from H, hydroxyl, alkyl or hydroxyalkyl groups of from 1 to about 4 carbon atoms; in one embodiment ethyl, hydroxyethyl, —OH or methyl. Of the remaining substituents, k is an integer of from 2-20, in another embodiment 2-12, and in still another embodiment 2-6, and in yet and in still another embodiment 2-4; m is an integer of from 1-20, in another embodiment 1-12, and in still another embodiment 1-6, and in still another embodiment 1-3; and n is an integer of from 0-20, in another embodiment 0-12, and in still another embodiment 0-6, and in still another embodiment 0-1.

Betaines have the general formula:

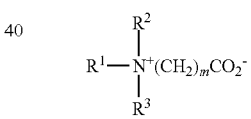

(V)

wherein $R^1$ either can be an alkyl group from 12 to about 26 carbon atoms which may be branched or straight chain, and which may be saturated or unsaturated, or $R^1$ can be in the form of $RC(O)NH(CH_2)_k$ where R is an alkyl group from 11 to about 25 carbon atoms which may be branched or straight chain, and which may be saturated or unsaturated, and k is an integer of from 2 to about 4; $R^2$ and $R^3$ are each independently selected from a straight chain or branched alkyl or hydroxyalkyl group of from 1 to about 6 carbon atoms, in another embodiment, of 1 to 4 carbon atoms and still another embodiment from 1 to 3 carbon atoms; and m is an integer of from 1 to about 5.

In one embodiment in the present invention, the viscoelastic surfactant is a betaine having a formula (Va):

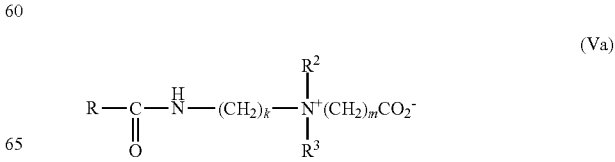

(Va)

wherein R is an alkyl group from 11 to about 25 carbon atoms which may be branched or straight chain, and which may be saturated or unsaturated; $R^2$ and $R^3$ are each independently selected from a straight chain or branched, alkyl or hydroxyalkyl group of from 1 to about 6 carbon atoms, in another embodiment, of 1 to 4 carbon atoms and still another embodiment from 1 to 3 carbon atoms; k is an integer of from 2 to about 4; m is an integer of from 1 to about 5.

Amidoamine oxide surfactants have the general formula:

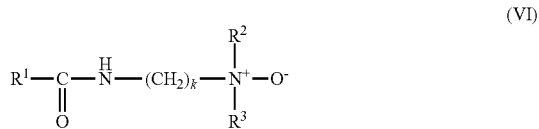

(VI)

wherein $R^1$ is a saturated or unsaturated, linear or branched chain aliphatic group of at least about 7 carbon atoms, in one embodiment at least about 14, in one embodiment up to about 30 carbon atoms, in one embodiment up to about 21 carbon atoms; $R^1$ may be restricted to a single chain length or may be of mixed chain length such as those groups derived from natural fats and oils or petroleum stocks; k is an integer from 2 to about 6; $R^2$ and $R^3$ are the same or different and are independently selected from alkyl or hydroxyalkyl groups of from 1 to about 4 carbon atoms and in one embodiment are selected from hydroxyethyl or methyl.

In one aspect of the invention, a method of treating a subterranean formation, said formation being provided with a wellbore, comprises
 a. providing a composition comprising an aqueous fluid, a viscoelastic surfactant, and at least one breaking compound, the breaking compound being selected from one or more hydrophobically-modified alkali-swellable emulsion polymers,
 b. injecting the composition into the subterranean formation via the wellbore, whereby the composition is present in the formation as a viscous fluid, and
 c. allowing the breaking agent to act upon the viscous fluid, whereby the breaking agent reduces the viscosity of the viscous fluid.

Advantageously the breaking agent of the present invention can be mixed with the aqueous fluid and the viscoelastic surfactant before or during the injection of the composition through the wellbore into the subterranean formation, to allow thorough mixing. Because the breaking agent is a delayed breaker, the composition is present as a viscous fluid when first injected into the subterranean formation. Thus the viscous fluid has time to perform its function in the subterranean formation with respect to fracturing, acidizing, gravel packing, or the like. After a period of time, the delayed breaking agent of the present invention will begin to act upon the high viscosity fluid to break the viscoelastic gel, thereby facilitating removal of the composition from the formation. The time interval between the preparation of the composition and the commencement of breaking of the viscoelastic gel, and the rate of breaking of the gel once breaking has commenced, each can depend upon the composition of the aqueous fluid, the selection of the viscoelastic surfactant, the selection of the delayed breaking agent of the present invention, and in some cases by the environment of the subterranean formation. Therefore one skilled in the art will be able to control the amount of time that the composition has to perform a function upon the subterranean formation, and the time from completion of the performance of that function to the time the composition can be removed, by selection of the appropriate parameters.

Subterranean operations in which the methods and compositions of the present invention can find utility include those described, for example, in U.S. Pat. No. 7,879,770. In treatments that typically include multiple stages, such as most hydraulic fracturing, acid fracturing, frac-packing, and gravel packing embodiments, the delayed breaker may be added in the pad, throughout the treatment or to only some of the stages, such as some of the proppant, gravel, acid, or diversion stages. A delayed breaker is particularly useful in hydraulic fracturing, frac-packing, and gravel packing because mechanical removal methods are impossible and methods involving contacting the additive with an additional fluid are not always practical. The compositions and methods of the Invention are also particularly useful in cases where it is desirable to allow a certain amount of treatment fluid to enter the formation, for example for the purpose of altering formation wettability or oil or water saturation.

Treatment fluids used with the compositions and methods of the Invention typically also contain other materials such as demulsifiers, corrosion inhibitors, friction reducers, clay stabilizers, scale inhibitors, biocides, breaker aids, mutual solvents, surfactants, anti-foam agents, defoamers, viscosity stabilizers, iron control agents, diverters, emulsifiers, foamers, oxygen scavengers, pH control agents, buffers, and the like.

Compatibility of delayed breakers disclosed herein with such additives should be checked in the laboratory. The treatments of the Invention are conducted normally; the treatment fluid and additives are transported to the site, mixed, stored, and pumped in the usual ways for the respective chemicals. When Resin Coated Proppants (RCP's) are used, testing should be done to ensure that the RCP's and delayed breakers are compatible and that neither interferes with the performance of the other; conventional natural and synthetic proppants and gravels may normally be used without testing.

The Invention is carried out by considering information about the well, the formation, the fluids and additives available, and criteria for a successful treatment, and preparing an optimized plan for maximizing treatment performance according to the data and the criteria. This is usually done by analyzing the well using treatment design and evaluation software; for example, in hydraulic fracturing software, pressure gradients are combined with fracture length and height evolution algorithms, complete leak-off information, and the effects of multiple fluid injections and their temperature changes.

The optimal concentration of the delayed breaker can be determined by choosing the breaking time and rate and measuring the break with samples of the intended fluids under the intended formation conditions. Measurement of breaking, and prediction and control of breaking, are familiar to those of ordinary skill in the arts of well stimulation and sand control. The viscoelastic surfactant should be present in an amount sufficient to provide the desired viscosity, which is needed to divert acid flow, reduce fluid loss, suspend particles and so on. The concentration of viscoelastic surfactant can be at least about 0.005%, at least about 0.01%, at least about 0.1%, at least about 0.5%, in one embodiment at least about 3%, in one embodiment up about 20%, in one embodiment up to about 10%, in one embodiment, in one embodiment up to about 8%, and in one embodiment up to about 5% by weight or by volume of the surfactant gel.

It should be understood that throughout this specification, when a concentration or amount range is listed or described as being useful, or suitable, or the like, it is intended that any and every concentration within the range, including the end points, is to be considered as having been stated. Furthermore, each numerical value should be read once as modified by the term "about" (unless already expressly so modified) and then read again as not so modified unless otherwise stated in context. For example, "a range of from 1 to 10" is to be read as indicating each and every possible number along the continuum between about 1 and about 10. In other words, when a certain range is expressed, even if the specification explicitly identifies or refers to only a few specific data points within the range, or even to no data points within the range, it is to be understood that the inventors appreciate and understand that any and all data points within the range are to be considered to have been specified, and that the inventors have possession of the entire range and all points within the range.

The delayed breakers of the Invention may be added to a wellbore fluid by metering them in to the base water fluid as a concentrated liquid. If the material is received as an emulsion, dispersion, or slurry, it can be stored in that form and used in that form directly. If it is received in dry form (for example as a solid dispersible powder of fine particles or as a dry emulsion) the particles can be pre-dispersed in water or brine as required and metered in as a liquid stream, or alternatively they may be added as solids to the base fluid stream.

The reactivity of a given delayed breaker at a particular temperature and in contact with a viscosified fluid or fluids of a particular composition (for example pH and the concentration and nature of other components, especially electrolytes), is readily determined by a simple experiment: exposing the fluid or fluids to the oxidative internal breaker under treatment conditions and monitoring the viscosity.

The delayed breakers of this Invention may be used with VES's made with any type of surfactant, or mixtures of surfactants, with or without one or more co-surfactants, and with or without other additives intended to stabilize or modify the properties of the micelles or vesicles (such as buffers, shear recovery additives, salts, and rheology boosters).

The invention will be illustrated in the Examples and accompanying Figures by the surfactant erucamidopropyl hydroxypropylsultaine, of formula IVa where $R^1$ is erucyl, $R^2$ and $R^3$ are each methyl, $R^4$ is hydroxyl, k=3, m=1 and n=1, and referred to in the Examples and the Figures as "Sultaine VES."

The invention will be illustrated by the following examples in which the breaker is one of the following hydrophobically modified alkali swellable emulsion polymers, each available from Akzo Nobel Surface Chemistry LLC, Chicago, Ill.

| HASE Polymer Breaker | Trade Name |
| --- | --- |
| #1 | Alcogum L-265 |
| #2 | Alcogum SL-70 |
| #3 | Alcogum SL-920 |

General Procedures for Examples 1-7

The general procedure to make the samples are: To a 500 ml stainless steel cup of a lab blender (Waring® 7010G blender, Model WF2211212) was added a brine solution followed by certain amount (by volume) of viscoelastic surfactant and a HASE polymer. The resulting mixture was stirred for 3 min at low setting followed by 30 seconds at high setting. The resultant gel was then centrifuged at 1500 rpm for 10 min to remove air bubbles. The sample was placed in a glass, which was placed in a pressurized and sealed stainless steel pressure cell. The sample in the pressure cell was then aged in an oven at a specific temperature for a specific time. Rheological performance was evaluated using a Grace Instrument Rheometer (model M5600). A pressure of 400 psi was applied to minimize evaporation of the sample, especially at high temperatures. Viscosity was measured with temperature ramping from 75° F. to 350° F., at a shear rate of 100 $s^{-1}$. Shear rate ramp was also performed with shear ramping down from 100 $s^{-1}$ to 75 $s^{-1}$, 50 $s^{-1}$, and 25 $s^{-1}$, 10 $s^{-1}$, 1 $s^{-1}$, and 0.1 $s^{-1}$, and then ramping up to 1 $s^{-1}$, 10 $s^{-1}$, 25 $s^{-1}$, 50 $s^{-1}$, 75 $s^{-1}$ and 100 $s^{-1}$.

Example 1

Example 1 was run on the samples of 6% Sultaine VES in 4% KCl brine, with and without 1.67% HASE polymer breaker #1. The viscosity of the non-aged sample with 1.67% breaker #1 was significantly higher than the viscosity of the non-aged sample without breaker. After aging for 5 days at 240° F., the sample with 1.67% breaker #1 showed almost zero viscosity, indicating a complete breaking of the gel viscosity, and its viscosity was lower than the viscosity of the sample without breaker.

Example 2

Example 2 was run on the samples of 6% Sultaine VES in 4% KCl brine, with and without 1.67% HASE polymer breaker #2. The viscosity of the non-aged sample with 1.67% breaker #2 was lower than the viscosity of the non-aged sample without breaker. After the samples were aged for 3 days (FIG. 2A) and 5 days (FIG. 2B) at 240° F., the samples with 1.67% breaker #2 showed almost zero viscosity and had lower viscosities than the samples without breaker.

Example 3

Example 3 was run on the samples of 6% Sultaine VES in 4% KCl brine, with and without 1.67% HASE polymer breaker #3. The viscosity of the non-aged sample with 1.67% breaker #3 was lower than the viscosity of the non-aged sample without breaker. After the samples were aged for 3 days (FIG. 3A) and 5 days (FIG. 3B) at 240° F., the samples with 1.67% breaker #3 showed almost zero viscosity and had lower viscosities than the samples without breaker.

Example 4

Example 4 was run on the samples of 6% Sultaine VES in 30% $CaCl_2$ brine, with and without 1.67% HASE polymer breaker #1. The viscosity of the non-aged sample with 1.67% breaker #1 was significantly higher than the viscosity of the non-aged sample without breaker. After the samples were aged for 1 day (FIG. 4A), 3 days (FIG. 4B) and 5 days (FIG. 4C) at 285° F., the samples with 1.67% breaker #1 showed almost zero viscosity and had lower viscosities than the samples without breaker.

Example 5

Example 5 was run on the samples of 6% Sultaine VES in 30% CaCl$_2$ brine, and with breaker #1. The amount of breaker #1 was varied at 1.67%, 0.67%, 0.17% and 0% (no breaker). The samples were aged at 285° F. for 1 day. The samples with 0.67% and 0.17% breaker #1 showed lower viscosity than the sample without breaker. The sample with 1.67% breaker #1 showed lower viscosity than the sample without breaker when temperature is greater than 120° F.

Example 6

Example 6 was run on the samples of 6% Sultaine VES in 30% CaCl$_2$ brine, with and without 1.67% HASE polymer breaker #2. Similarly to Example 2, breaker #2 reduced, but did not completely break the viscosity before aging, thus viscosity of the non-aged sample with 1.67% breaker #2 was lower than the viscosity of the non-aged sample without breaker. After the samples were aged for 5 hours (FIG. 6A), 1 day (FIG. 6B), 3 days (FIG. 6C), and 5 days (FIG. 6D) at 285° F., the samples with 1.67% breaker #2 completely broke the gel viscosity (showing almost zero viscosity), while samples without breaker showed higher viscosity and did not completely break the gel.

Example 7

Example 7 was run on the samples of 6% Sultaine VES in 30% CaCl$_2$ brine, and with breaker #2. The amount of breaker #2 was varied at 1.67%, 0.67%, 0.33%, 0.17% and 0% (no breaker). The samples were aged at 285° F. for 1 day. The samples with breaker #2 all showed lower viscosity than the sample without breaker. Samples with 0.33%, 0.67% and 1.67% all broke the viscosity to almost zero.

Example 8

Example 8 was run on the samples of 6% Sultaine VES in 30% CaCl$_2$ brine, with and without 1.67% HASE polymer breaker #3. Similarly to Example 3, breaker #3 reduced, but did not completely break the viscosity before aging, thus viscosity of the non-aged sample with 1.67% breaker #3 was lower than the viscosity of the non-aged sample without breaker. After the samples were aged for 1 day (FIG. 8A), 3 days (FIG. 8B), and 5 days (FIG. 8C) at 285° F., the samples with 1.67% breaker #3 completely broke the gel viscosity (showing almost zero viscosity), while samples without breaker showed higher viscosity and did not completely break the gel.

Although the invention is illustrated and described herein with reference to specific embodiments, the invention is not intended to be limited to the details shown.

Rather, various modifications may be made in the details within the scope and range of equivalents of the claims and without departing from the spirit of the invention.

The invention claimed is:

1. A composition comprising an aqueous fluid, a viscoelastic surfactant, and at least one breaking compound, the breaking compound being a hydrophobically modified alkali swellable emulsion copolymer, wherein the copolymer is formed from a polymerization mixture comprising about 10 to about 75 weight percent of one or more acidic monomers or salts thereof; about 10 to about 90 weight percent of one or more nonionic monomers or salts thereof; and about 0.1 to about 25 weight percent of one or more associative monomers or salts thereof, all on a total monomer mixture weight basis.

2. The composition of claim 1 wherein the viscoelastic surfactant is zwitterionic, cationic, anionic, or amphoteric.

3. The composition of claim 1 wherein the viscoelastic surfactant is selected from the group consisting of betaines, sultaines, and amidoamine oxides.

4. The composition of claim 1 wherein the one or more nonionic monomers are of a formula selected from

wherein, in each of formulas (I) and (II),
X is H or methyl;
Z is —C(O)OR$^1$, —C(O)NH$_2$, —C(O)NHR$^1$, —C(O)N(R$^1$)$_2$, —C$_6$H$_4$R$^1$, —C$_6$H$_4$OR$^1$, —C$_6$H$_4$Cl, —CN, —NHC(O)CH$_3$, —NHC(O)H, N-(2-pyrrolidonyl), N-caprolactamyl, —C(O)NHC(CH$_3$)$_3$, —C(O)NHCH$_2$CH$_2$—N-ethyleneurea, —SiR$_3$, —C(O)O(CH$_2$)$_x$SiR$_3$, —C(O)NH(CH$_2$)$_x$SiR$_3$, or —(CH$_2$)$_x$SiR$_3$; where x is an integer in the range of 1 to about 6;
each R is independently C$_1$-C$_{18}$ alkyl; and
each R$^1$ is independently C$_1$-C$_{30}$ alkyl, hydroxy-substituted C$_1$-C$_{30}$ alkyl, or halogen-substituted C$_1$-C$_{30}$ alkyl.

5. The composition of claim 1 wherein the one or more nonionic monomers are selected from C$_1$-C$_{30}$ alkyl (meth)acrylates, C$_1$-C$_{30}$ hydroxyalkyl esters of (meth)acrylic acid, C$_1$-C$_{30}$ alkyl (meth)acrylamides, styrene, substituted styrenes, vinyl esters, unsaturated nitriles; and unsaturated silanes.

6. The composition of claim 5 wherein the one or more nonionic monomers are selected from 2-methyl styrene, butyl styrene, isopropyl styrene, p-chloro styrene, vinyl acetate, vinyl butyrate, vinyl caprolate, vinyl pivalate, vinyl neodecanoate, methacrylonitrile, acrylonitrile, trimethylvinylsilane, dimethylethylvinylsilane, allyldimethylphenylsilane, allytrimethylsilane, 3-acrylamidopropyltrimethylsilane, and 3-trimethylsilylpropyl methacrylate.

7. The composition of claim 5 wherein the one or more nonionic monomers are selected from butadiene, isoprene, vinyl chloride, and vinylidene chloride.

8. The composition of claim 1 wherein the one or more acidic monomers are selected from acidic, polymerizable, ethylenically unsaturated monomers containing at least one carboxylic acid, sulfonic acid group, or a phosphonic acid group.

9. The composition of claim 8 wherein the one or more acidic monomers are selected from the group consisting of acrylic acid, methacrylic acid, itaconic acid, citraconic acid, maleic acid, fumaric acid, crotonic acid, aconitic acid, methyl hydrogen maleate, monoisopropyl maleate, butyl hydrogen fumarate, maleic anhydride, itaconic anhydride, citraconic anhydride, vinyl sulfonic acid, 2-sulfoethyl methacrylate, styrene sulfonic acid, 2-acrylamido-2-methylpropane sulfonic acid, allyloxybenzene sulfonic acid, vinyl phosphonic acid, allyl phosphonic acid, 3-acrylamidopropyl phosphonic acid, and salts of any of the foregoing.

10. The composition of claim 1 wherein the one or more associative monomers comprise (i) an ethylenically unsaturated end group portion for addition polymerization with the other monomers of the system; (ii) an optional polyoxyalkylene midsection portion, and (iii) a hydrophobic end group portion.

11. The composition of claim 10 wherein the ethylenically unsaturated end group portion (i) of the one or more associative monomers is derived from an α,β-ethylenically unsaturated mono- or di-carboxylic acid or the anhydride thereof, from an allyl ether, from a vinyl ether, from a nonionic vinyl-substituted urethane monomer, or from a vinyl-substituted urea reaction product; the optional polyoxyalkylene midsection portion (ii) of the one or more associative monomers is a polyoxyalkylene segment of about 5 to about 250 repeating $C_2$-$C_7$ alkylene oxide units; and the hydrophobic end group portion (iii) of the one or more associative monomers is a hydrocarbon moiety selected from the group consisting of a $C_8$-$C_{40}$ linear alkyl, an aryl-substituted $C_2$-$C_{40}$ alkyl, a $C_2$-$C_{40}$ alkylsubstituted phenyl, a $C_8$-$C_{40}$ branched alkyl, a $C_8$-$C_{40}$ carbocyclic alkyl; and a $C_8$-$C_{80}$ complex ester.

12. The composition of claim 1 wherein the at least one breaking compound comprises a hydrophobically modified alkali swellable emulsion polymer that is an acrylate polymer, an itaconate polymer and a methyl acrylic acid/ethyl acetate/methacrylate polymer.

13. A method of treating a subterranean formation, said formation being provided with a wellbore, the method comprising
   a. providing a composition comprising an aqueous fluid, a viscoelastic surfactant, and at least one breaking compound, the breaking compound being a hydrophobically modified alkali swellable emulsion copolymer, wherein the copolymer is formed from a polymerization mixture comprising about 10 to about 75 weight percent of one or more acidic monomers or salts thereof; about 10 to about 90 weight percent of one or more nonionic monomers or salts thereof; and about 0.1 to about 25 weight percent of one or more associative monomers or salts thereof, all on a total monomer mixture weight basis,
   b. injecting the composition into the subterranean formation via the wellbore, whereby the composition is present in the formation as a viscous fluid, and
   c. allowing the breaking agent to act upon the viscous fluid, whereby the breaking agent reduces the viscosity of the viscous fluid.

14. A method of treating a subterranean formation, the method comprising applying a hydrophobically modified alkali swellable emulsion copolymer, wherein the copolymer is formed from a polymerization mixture comprising about 10 to about 75 weight percent of one or more acidic monomers or salts thereof; about 10 to about 90 weight percent of one or more nonionic monomers or salts thereof; and about 0.1 to about 25 weight percent of one or more associative monomers or salts thereof, all on a total monomer mixture weight basis, as a breaking compound for a viscous fluid contained within the subterranean formation, the viscous fluid comprising a viscoelastic surfactant, to reduce the viscosity of the viscous fluid.

* * * * *